United States Patent
Lei et al.

(10) Patent No.: US 7,043,597 B2
(45) Date of Patent: May 9, 2006

(54) SYSTEM AND METHOD FOR UPDATING FIRMWARE IN A NON-VOLATILE MEMORY WITHOUT USING A PROCESSOR

(75) Inventors: Yung-Chun Lei, Hsin-Chu (TW); Chun-Nan Lin, Hsin-Chu (TW)

(73) Assignee: MediaTek Inc., Hsien (TW)

( * ) Notice: Subject to any disclaimer, the term of this patent is extended or adjusted under 35 U.S.C. 154(b) by 310 days.

(21) Appl. No.: 10/605,030

(22) Filed: Sep. 3, 2003

(65) Prior Publication Data
US 2004/0117541 A1 Jun. 17, 2004

(30) Foreign Application Priority Data
Sep. 5, 2002 (TW) ............................... 91120385 A (51) Int. Cl.
*G06F 12/00* (2006.01)
(52) U.S. Cl. .................... 711/103; 711/115; 711/154; 711/163; 711/170; 710/8; 710/10; 710/13; 713/1; 713/100
(58) Field of Classification Search ................ 711/103, 711/115, 154, 163, 170; 710/8, 10, 13; 713/1, 713/100
See application file for complete search history.

(56) References Cited

U.S. PATENT DOCUMENTS

| | | | | |
|---|---|---|---|---|
| 5,502,765 A | * | 3/1996 | Ishiguro et al. ............... 705/67 |
| 5,603,056 A | * | 2/1997 | Totani ............................ 710/8 |
| 5,819,108 A | * | 10/1998 | Hsu et al. ...................... 710/10 |
| 5,901,330 A | * | 5/1999 | Sun et al. ....................... 710/8 |
| 5,987,605 A | * | 11/1999 | Hill et al. ....................... 713/2 |
| 6,009,497 A | * | 12/1999 | Wells et al. ................. 711/103 |
| 6,038,640 A | * | 3/2000 | Terme ........................ 711/115 |
| 6,170,043 B1 | * | 1/2001 | Hu ............................. 711/158 |
| 6,253,281 B1 | * | 6/2001 | Hall ............................ 711/112 |
| 6,523,083 B1 | | 2/2003 | Lin et al. |
| 6,745,325 B1 | * | 6/2004 | Gavlik ........................ 713/100 |
| 2003/0229752 A1 | * | 12/2003 | Venkiteswaran ............ 711/103 |

OTHER PUBLICATIONS

Jex, "Flash Memory BIOS For PC and Notebook Computers," pp. 692-695, IEEE, May 1991.*

* cited by examiner

Primary Examiner—Stephen C. Elmore
(74) Attorney, Agent, or Firm—Winston Hsu (57) ABSTRACT

The processing system is electrically connected to a computer and has a non-volatile memory (NVM) for storing firmware and an NVM control interface having a plurality of registers for updating and reading data stored in the NVM. When the NVM control interface updates a current piece of data stored in the NVM, the NVM control interface first reads a prior piece of data that is stored in the NVM prior to the current piece of data and transmits the prior piece of data to the computer for comparison, then the NVM control interface updates the current piece of data.

18 Claims, 8 Drawing Sheets

SYSTEM AND METHOD FOR UPDATING FIRMWARE IN A NON-VOLATILE MEMORY WITHOUT USING A PROCESSOR

BACKGROUND OF INVENTION

1. Field of the Invention

The present invention relates to a processing system, and more particularly to a processing system capable of directly updating firmware stored in a non-volatile memory according to a protocol between a serial port and the non-volatile memory without utilizing a processor.

2. Description of the Prior Art

Because data stored in a non-volatile memory will not be lost after its electric power is cut off, the non-volatile memory is a very important component in a computer system for storing system data, i.e. firmware. Firmware of a processing system, thus, is usually stored in a non-volatile memory so that the processing system can operate regularly after it is turned on.

Figure 1:
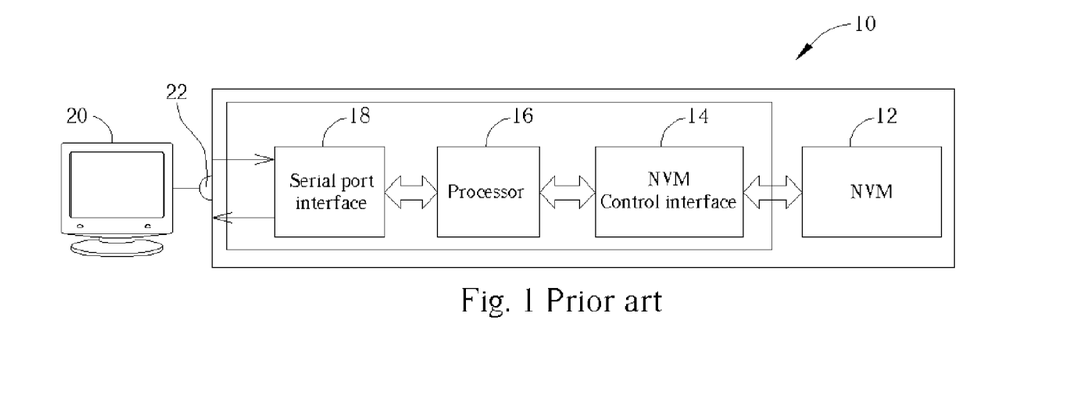
FIG. 1 is a functional block diagram of a processing system connected to a computer according to the prior art.

Please refer to FIG. 1 that is a functional block diagram of a processing system 10 connected to a computer 20 according to the prior art. The processing system 10 comprises a non-volatile memory (NVM) 12 and a NVM control interface 14. The NVM control interface 14 comprises a plurality of registers for updating and accessing data stored in the NVM 12. The processing system 10 further comprising a processor 16 and a serial port interface 18 electrically connected to a computer 20 via a serial port 22. The processor 16 is used to control operations of the processing system 10 and is electrically connected to the NVM control interface 14 to use the NVM control interface 14 to update the data stored in the NVM 12. The processor 16 is also electrically connected to the serial port interface 18 to use the serial port interface 18 to exchange data with the computer 20 by processing data conversion between serial data bits and data bytes.

During the update of the firmware, the processor 16 must be used to process the update data, i.e. the data used to update the firmware. Moreover, before the processor 16 updates the firmware stored in the NVM 12, some program code stored in the NVM 12, which is necessary for the processor 16, must be stored in another memory, such as a built-in static random access memory (SRAM), or a part of the NVM 12 must be isolated to store the program code.

However, using the SRAM to store the program codes increases the cost of the processing system, and isolating the part of the NVM to store the program codes makes the update of the entire NVM 12 impossible. Furthermore, when the processor 16 is used to update the firmware, a cyclic redundancy check (CRC) method is used to check the data to ensure the correction of updated firmware. However, the correction of updated firmware cannot be guaranteed using the CRC method and it is time-consuming to process a high-accuracy CRC.

SUMMARY OF INVENTION

It is therefore a primary objective of the claimed invention to provide a processing system having a bus controller, the processing system for updating firmware stored in a non-volatile memory without utilizing a processor to solve the above-mentioned problems.

The processing system is electrically connected to a computer and comprises a non-volatile memory (NVM) for storing firmware needed by the processing system, and an NVM control interface having a plurality of registers for updating and reading data stored in the NVM. When the NVM control interface wants to update a piece of data stored in the NVM, the NVM control interface first reads a prior piece of data that is stored in the NVM and transmits this prior piece of data to the computer for comparison, then the NVM control interface updates the current piece of data.

The NVM is electrically connected to the computer via a NVM control interface and a serial port interface so that the computer can update the firmware stored in the NVM without utilizing the processor.

These and other objectives and advantages of the present invention will no doubt become obvious to those of ordinary skill in the art after reading the following detailed description of the preferred embodiment that is illustrated in the various figures and drawings.

DETAILED DESCRIPTION

Figure 2:
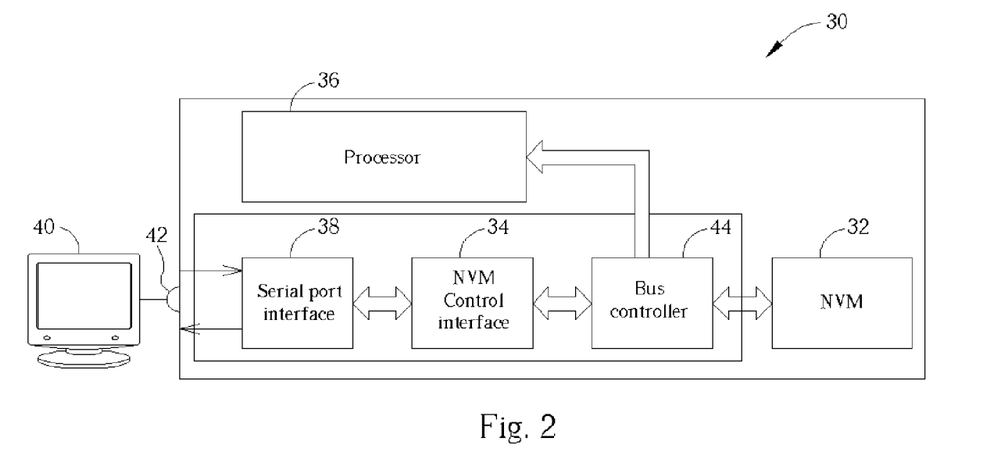
FIG. 2 is a functional block diagram of a processing system connected to a computer according to the present invention.

Please refer to FIG. 2 that is a functional block diagram of a processing system 30 connected to a computer 40 according to the present invention. Many of the characteristics of components of the processing system 30 are similar to the processing system 10, such as a NVM 32, a NVM control interface 34, a processor 36, and a serial port interface 38, so the descriptions of the functions of these components can be found in the description of the prior art and will be not repeated.

However, the major differences between the two processing systems 10 and 30 are that the processing system 10 utilizes the processor 16 to connect the NVM control interface 14 with the serial port interface 18 and to process the update data, while the serial port interface 38 of the processing system 30 is directly electrically connected to the NVM control interface 34. Additionally, the NVM control interface 34 is capable of using the data bytes that are generated by converting the serial bits received from the computer 40 to update the firmware stored in the NVM 32.

The processing system 30 further comprises a bus controller 44 electrically connected to the processor 36, the NVM 32, and the NVM control interface 34 for controlling data transmission between the processor 36, the NVM 32, and the NVM control interface 34. Generally, the bus controller 44 is used to establish the electric connection between the processor 36 and the NVM 32 so that the processor 36 can operate regularly with the help of the firmware stored in the NVM 32. However, when the processing system 30 uses the data received from the computer 40 to update the firmware stored in the NVM 32, the bus controller 44 abolishes the electric connection between the processor 36 and the NVM 32 and establishes the electric connection between the NVM control interface 34 and the NVM 32.

Figure 3:
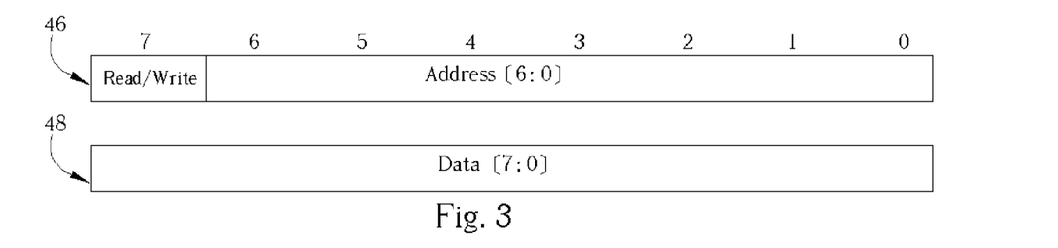
FIG. 3 shows the data structure of the data bytes according to the present invention.

Please refer to FIG. 3 that shows the data structure of the data bytes according to the present invention. As mentioned previously, the data bytes are used to update the firmware stored in the NVM 32 and are generated by converting the serial bits received from the computer 40. The data bytes comprise a command byte 46 and an information byte 48. The bit 7 of the command byte 46 is used to define an operational mode of the NVM control interface 34, i.e. a read mode or a write mode, and the other 7 bits 0–6 of the command byte 46 are used to record a memory address. The information byte 48 comprises the update data that is used to update the data stored in a corresponding address of the NVM 32, which corresponds to the address recorded in the bits 0–6 of the command byte 46.

Figure 4:
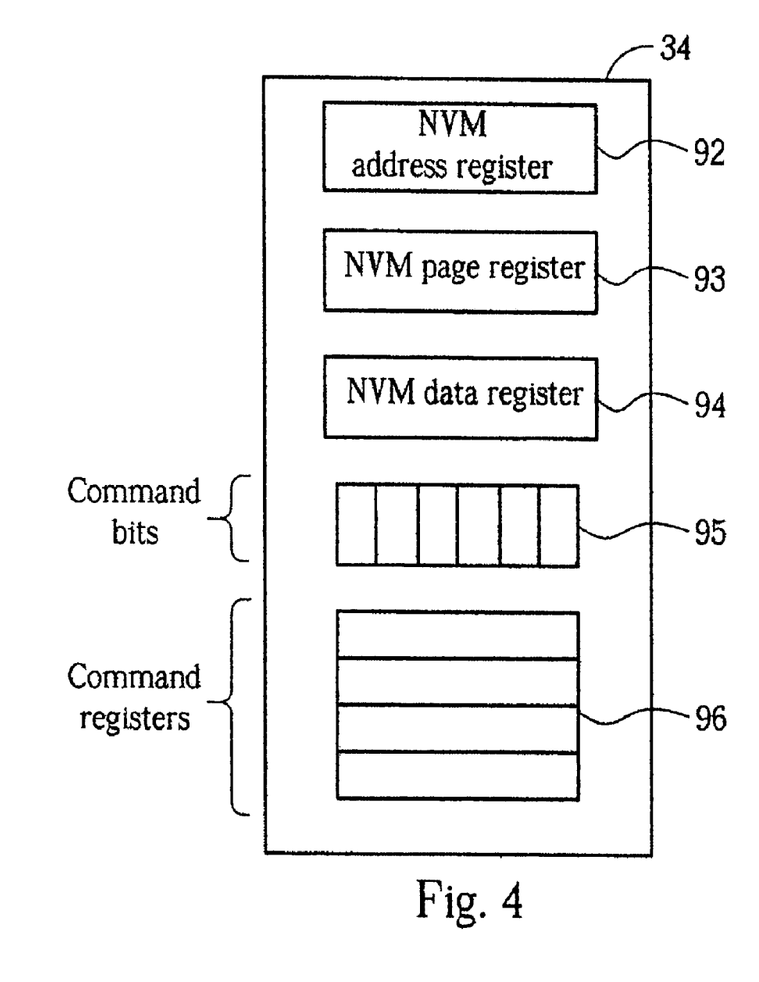
FIG. 4 is a functional block diagram of the NVM control interface in FIG. 2.

Please refer to FIG. 4 that is a functional block diagram of the NVM control interface 34. The NVM control interface 34 comprises an NVM address register 92 for specifying addresses of the NVM 92, an NVM page register 93 for specifying a download capacity of the NVM 32, an NVM data register 94 for storing a data byte stored in the address set by the NVM address register 92, a plurality of control bits 95 for specifying an operational mode of the NVM 32, and a plurality of command registers 96 for specifying commands to control operations of the NVM 32. Additionally, after each write/read (W/R) operation of the NVM 32 is finished, the address stored in NVM address register 92 is incremented. In the embodiment, a serial port 42 of the serial port interface 38 for connecting to the computer 40 is an RS-232 (Recommended Standard-232) port. For the purposes of this description, the processing system 30 will be used to identify a device as described above, but this should not construe the present invention as limited.

Figure 5:
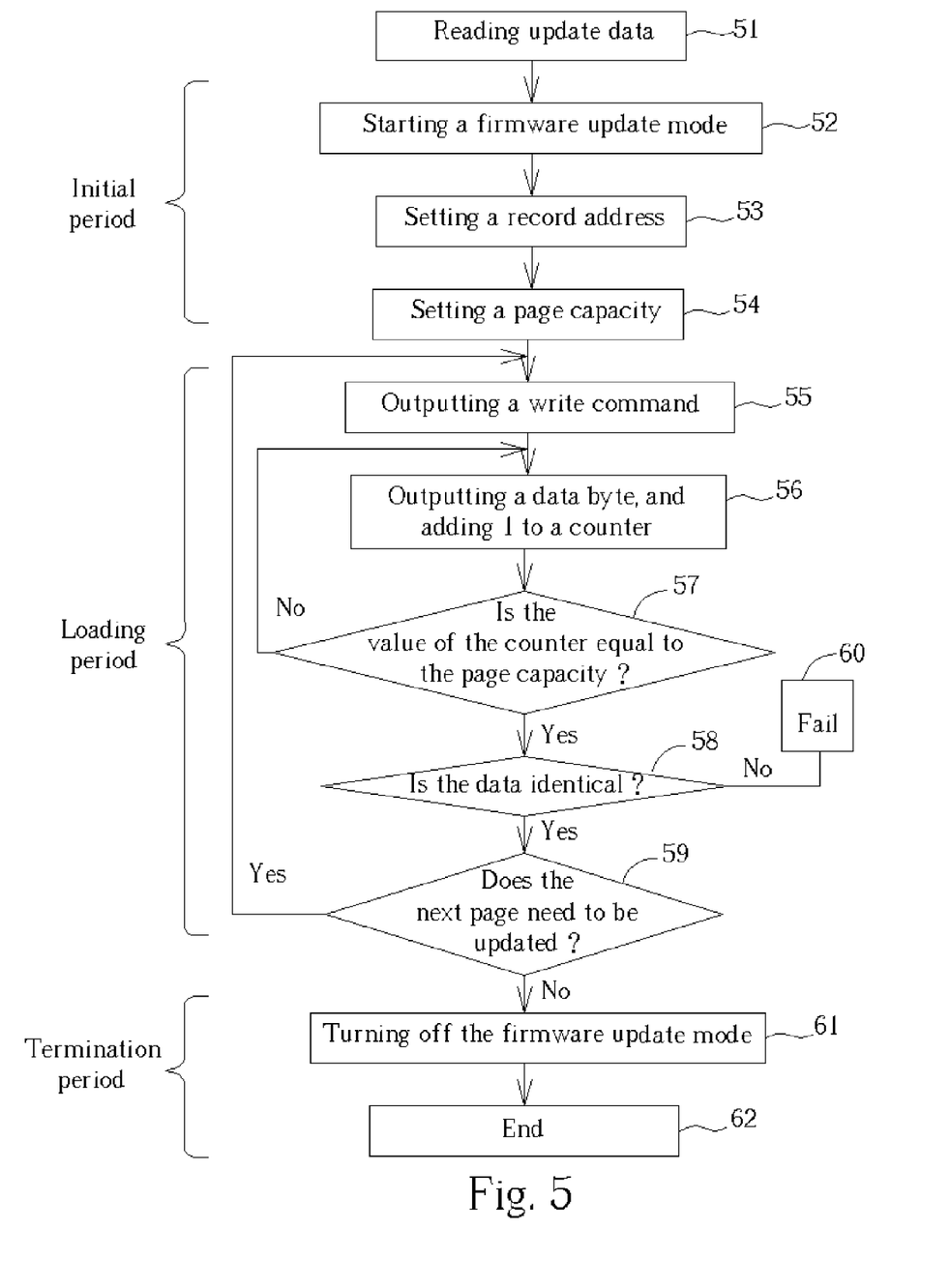
FIG. 5 is a flow chart of operations of the computer in FIG. 2 when updating the NVM using a non-handshake mode method.

In the following descriptions are about the control flows of the computer 40 and the NVM control interface 34. There are two modes of their operations, one is handshake mode and the other is non-handshake mode. The difference between these two modes is the waiting of last write commands. This is because the writing time of NVM is very long. If the writing time is longer than the transmitting time, it is necessary to wait the last write command to be finished. Please refer to FIG. 5 that is a flow chart of operations of the computer 40 in FIG. 2 when updating the NVM 32 using a non-handshake mode method. The operations of the computer 40 for updating the NVM 32 are divided into an initial period, a loading period, and a termination period, and respectively comprises following steps:

Initial period:
Step 51: reading the data for updating the firmware stored in the NVM 32;
Step 52: starting a firmware update mode;
Step 53: setting a record address;
Step 54: setting a page capacity;

Loading period:
Step 55: outputting a write command for writing data into the NVM 32 via the serial port 42;
Step 56: outputting a data byte read in step 51 via the serial port 42, and adding 1 to a counter;
Step 57: checking whether the value of the counter is equal to the page capacity. If the value of the counter is equal to the page capacity, then go to step 58. Otherwise, go to step 56;
Step 58: comparing the piece of data of the NVM 32 received from the NVM control interface 34 with the piece of data read in step 51 to determine whether the two pieces of data are identical. If the two pieces of data are identical, then go to step 59. Otherwise, go to step 60;
Step 59: determining whether the next page needs to be updated. If the next page needs to be updated, then go to step 55. Otherwise, go to step 61;
Step 60: turning into a fail-transmission mode;

Termination period:
Step 61: turning off the firmware update mode; and
Step 62: finishing the update of the firmware stored in the NVM 32.

During the initial period, the statuses of the registers, such as the NVM address register 92 and the NVM page register 93, of the NVM control interface 34 are reset. During the loading period, the write command and the update data are transmitted to the NVM control interface 34. Meanwhile, the NVM control interface 34 reads a previous piece of data that is stored in the NVM 32 prior to the current piece of data and transmits the previous piece of data to the computer 40 for comparison. Then the NVM control interface 34 updates the current piece of data in the NVM 32 and the address stored in NVM address register 92 is increased. Moreover, the previous piece of data may not be read and transmitted from the NVM 32 to the computer 40 for comparison until the update data for updating an entire page of the NVM 32 has been transmitted to the NVM control interface 34 so that switches in the data transmission direction between the processing system 30 and the computer 40 can be reduced. Finally, the update of the NVM 32 ends within the termination period.

Figure 6:
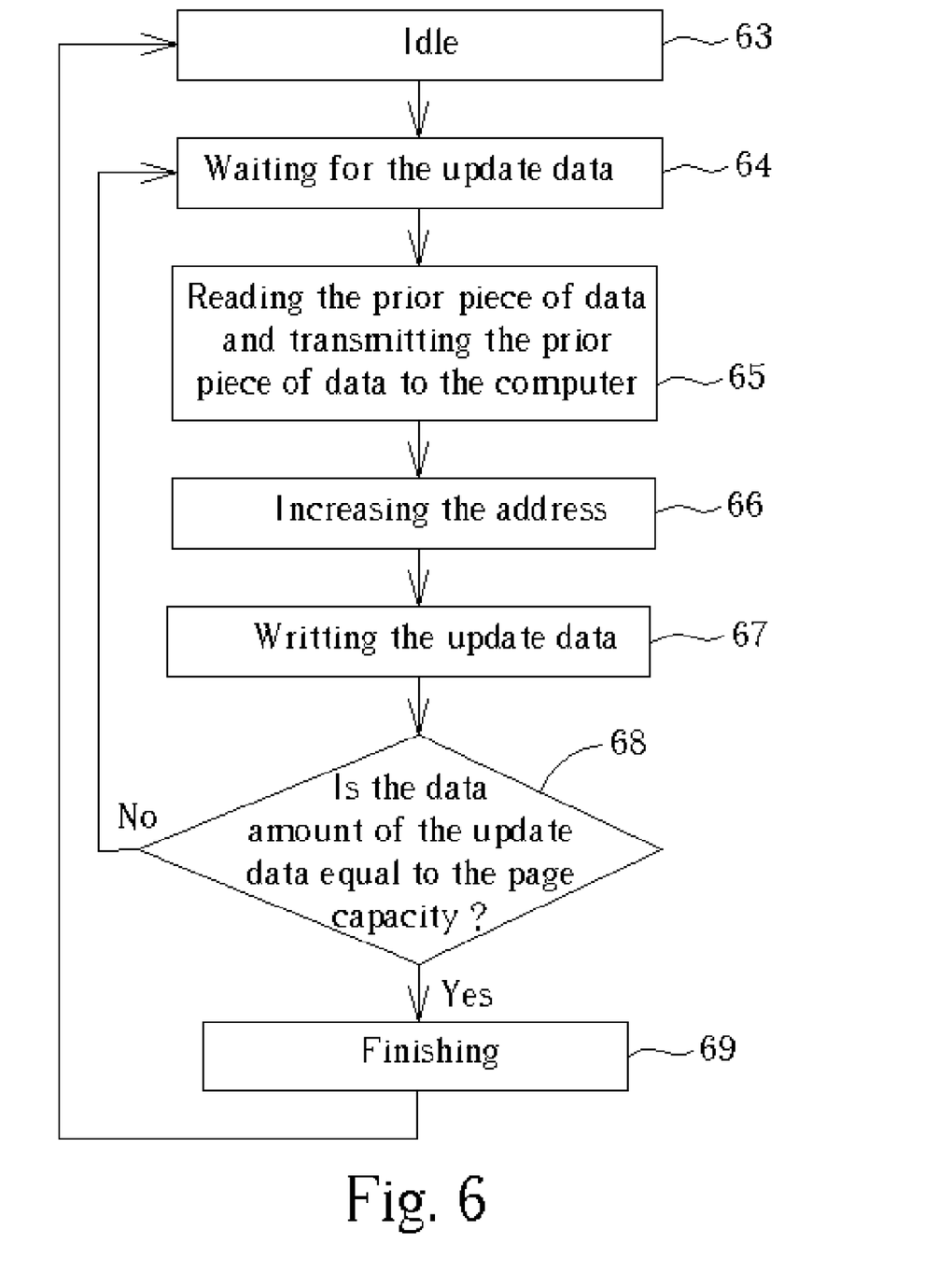
FIG. 6 is a flow chart of operations of the NVM control interface in FIG. 2 when using the non-handshake mode method.

Please refer to FIG. 6 that is a flow chart of operations of the NVM control interface 34 in FIG. 2 when using the non-handshake mode method. The operations include:
Step 63: being in an idle mode and waiting for the write command from the computer 40;
Step 64: waiting for the update data from the computer 40 after receiving the write command;
Step 65: receiving the update data from the computer 40 and reading a previous piece of data that is stored in the NVM 32 prior to the current piece of data and transmitting the previous piece of data to the computer 40 for comparison;
Step 66: increasing the address stored in the NVM address register 92;
Step 67: writing the update data into the corresponding address in the NVM 32;
Step 68: determining whether the data amount of update data is equal to the page capacity set by the NVM page register 93. If the data amount of the update data is equal to the page capacity, then go to step 69. Otherwise, go to step 64; and
Step 69: finishing the update of the NVM 32 and turning back to the idle mode.

After the NVM control interface 34 receives the write command, the NVM control interface 34 waits for the update data from the computer 40. When NVM control interface 34 receives the update data, NVM control interface 34 first reads the previous piece of data from the NVM 32 and transmits the previous piece of data to the computer 40 for comparison, and then the NVM control interface 34 writes the update data into the NVM 32 and the address stored in the NVM address register 92 is increased automatically. Finally, the processing system 30 finishes updating the firmware stored in the NVM 32.

Figure 7:
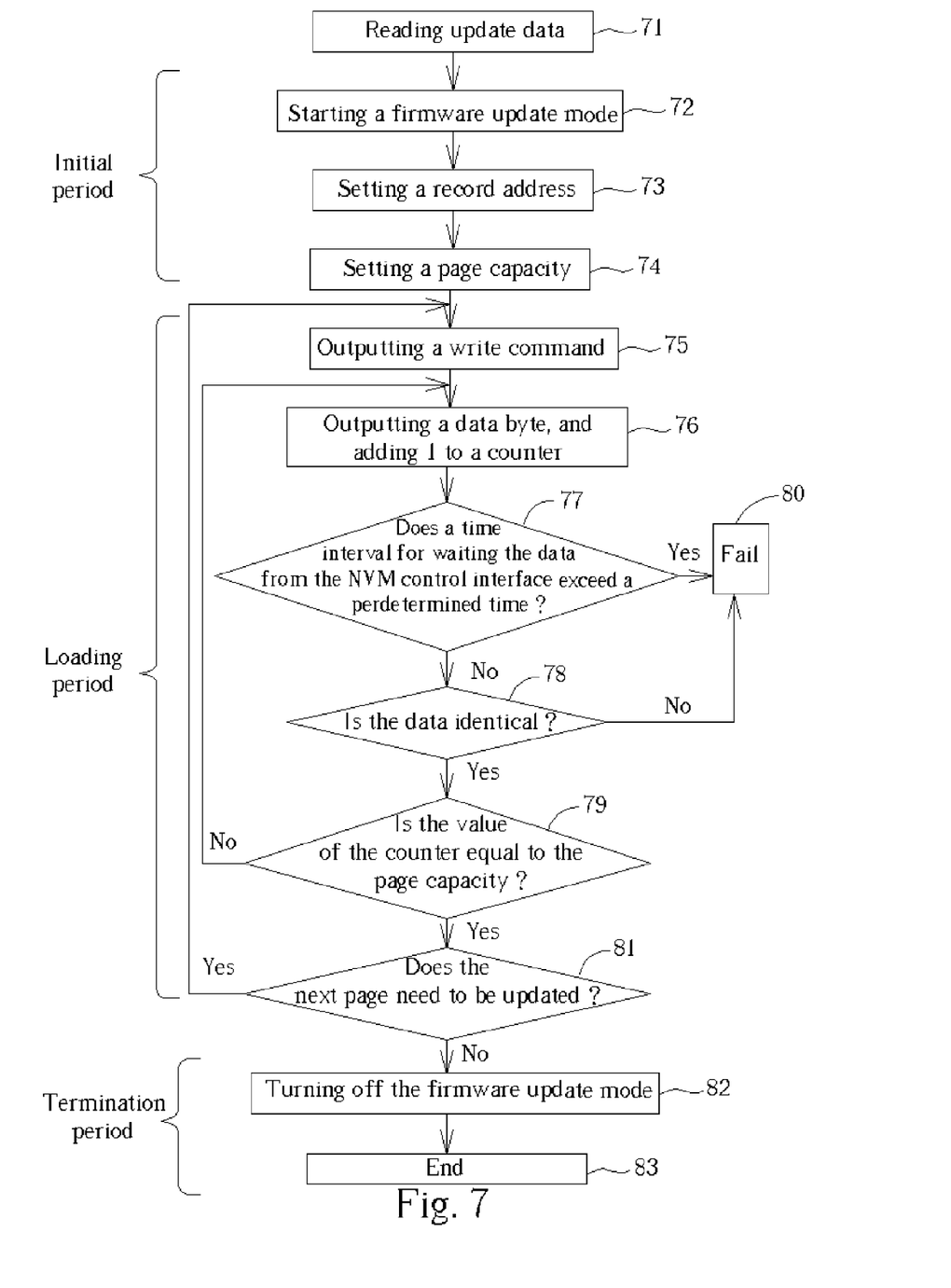
FIG. 7 is a flow chart of operations of the computer in FIG. 2 when updating the NVM using a handshake mode method.

Please refer to FIG. 7 that is a flow chart of operations of the computer 40 in FIG. 2 when updating the NVM 32 using a handshake mode method. The operations of the computer 40 for updating the NVM 32 are divided into an initial period, a loading period, and a termination period, and respectively comprises following steps:

Initial period:
Step 71: reading the data for updating the firmware stored in the NVM 32;
Step 72: starting a firmware update mode;
Step 73: setting a record address;
Step 74: setting a page capacity;

Loading period:
Step 75: outputting a write command for writing data into the NVM 32 via the serial port 42;
Step 76: outputting a data byte read in step 51 via the serial port 42, and adding 1 to a counter;
Step 77: waiting for data from the NVM control interface 34, and determining whether a time interval for waiting the data from the NVM control interface 34 exceeds a predetermined time interval. If the time interval exceeds the predetermined time interval, then go to step 80. Otherwise, go to step 78;
Step 78: comparing the piece of data of the NVM 32 received from the NVM control interface 34 with the piece of data read in step 51 to determine whether the two pieces of data are identical. If the two pieces of data are identical, then go to step 79. Otherwise, go to step 80;
Step 79: determining whether the value stored in the counter is equal to the page capacity. If the value stored in the counter is equal to the page capacity, then go to step 81. Otherwise, go to step 76;
Step 80: turning into a fail-transmission mode;
Step 81: determining whether the next page needs to be updated. If the next page needs to be updated, then go to step 75. Otherwise, go to step 82;

Termination period:
Step 82: turning off the firmware update mode; and
Step 83: finishing the update of the firmware stored in the NVM 32.

During the initial period, the statuses of the registers, such as the NVM address register 92 and the NVM page register 93, of the NVM control interface 34 are reset. During the loading period, the write command and the data for the update of the NVM 32 are transmitted to the NVM control interface 34. Meanwhile the NVM control interface 34 reads a previous piece of data that is stored in the NVM 32 prior to the current piece of data and transmits the previous piece of data to the computer 40 for comparison. If the previous piece of data received from the NVM control interface 34 is not identical with the corresponding data recorded by the computer 40, the action for updating the firmware stored in the NVM 32 is terminated. Finally, the update of the NVM 32 ends within the termination period.

Figure 8:
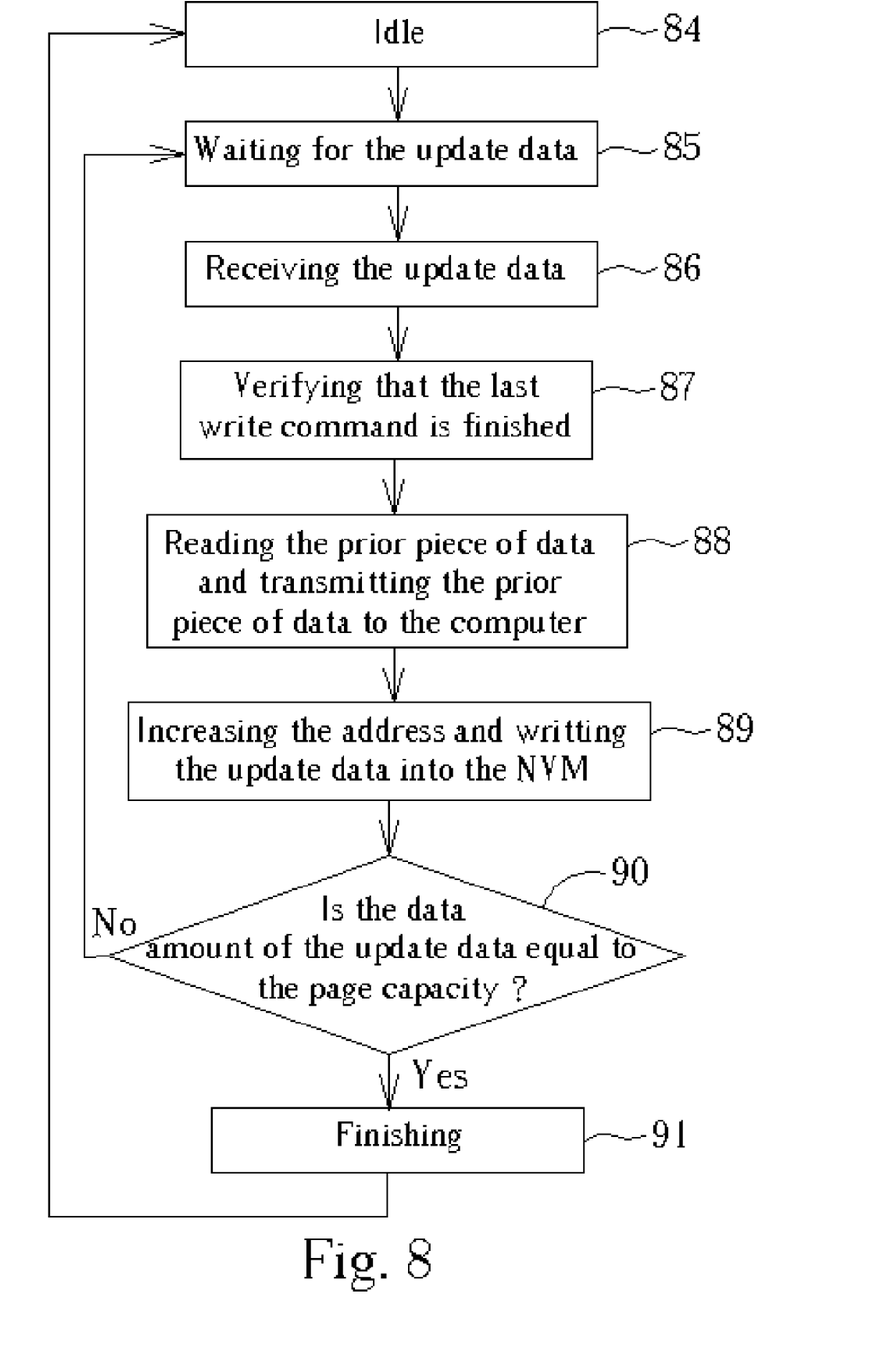
FIG. 8 is a flow chart of operations of the NVM control interface in FIG. 2 when using the handshake mode method.

Please refer to FIG. 8, which is a flow chart of operations of the NVM control interface 34 in FIG. 2 when using the handshake mode method. The operations include:
Step 84: being in an idle mode and waiting for the write command from the computer 40;
Step 85: waiting for the update data from the computer 40 after receiving the write command;
Step 86: receiving the update data from the computer 40;
Step 87: determining whether the last write action command has been finished;
Step 88: reading the current piece of data stored in the current address in the NVM 32, and transmitting the current piece of data to the computer 40;
Step 89: increasing the address stored in the NVM address register 92 and writing the update data into the corresponding address in the NVM 32;
Step 90: determining whether the data amount of the update data is equal to the page capacity set by the NVM page register 93. If the data amount of update data is equal to the page capacity, then go to step 91. Otherwise, go to step 85; and
Step 91: finishing the update of the NVM 32 and turning back to the idle mode.

After the NVM control interface 34 receives the write command, the NVM control interface 34 waits for the update data from the computer 40. When the NVM control interface 34 receives the update data, the NVM control interface 34 first verifies that the last write command is finished. When the last write command is finished, the NVM control interface 34 reads the current piece of data from the NVM 32 and transmits the current piece of data to the computer 40 for comparison, and then the address stored in the NVM address register 92 is increased automatically and the NVM control interface 34 writes the update data into the NVM 32. Finally, the processing system 30 finishes updating the firmware stored in the NVM 32.

In contrast to the prior art, the claimed invention provides a processing system capable of directly updating firmware stored in a non-volatile memory (NVM) by establishing a protocol with a serial port without utilizing a processor or isolating a part of the NVM for storing system program codes. The update data is verified byte by byte, so the accuracy of the update data can be guaranteed. Moreover, the total number of pins of the processing system for connecting a computer is reduced to 2, so the processing system can be easily used in many fields.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A processing system electrically connected to a computer, the processing system comprising:
a non-volatile memory (NVM) for storing firmware needed by the processing system; and
an NVM control interface having a plurality of registers for updating and reading data stored in the NVM;
wherein when the NVM control interface updates a current piece of data stored in the NVM, the NVM control interface is for first reading a previous piece of data being already updated in the NVM prior to the current piece of data and transmits the previous piece of data to the computer for comparison with original data that was previously stored in the NVM, if the previous piece of data and the original data are identical, the NVM control interface updates the current piece of data.

2. The processing system of claim 1 further comprising a processor for controlling operations of the processing system and a bus controller electrically connected to the processor, the NVM, and the NVM control interface for controlling data transmission between the processor, the NVM, and the NVM control interface.

3. The processing system of claim 2 wherein the processor is for loading the firmware from the NVM via the bus controller.

4. The processing system of claim 2 wherein during the update of the firmware stored in the NVM, the bus controller is for preventing data access between the processor and the NVM.

5. The processing system of claim 1 further comprising a serial port interface electrically connected between the computer system and the NVM control interface for converting serial data bits received from the computer into data bytes and for converting data bytes received from the NVM control interface into serial data bits.

6. The processing system of claim 5 wherein a serial port of the serial port interface is a RS-232 (Recommended Standard-232) port.

7. The processing system of claim 1 wherein before the NVM control interface reads the previous piece of data, the NVM control interface verifies whether or not the previous piece of data has been written into the NVM.

8. The processing system of claim 1 wherein the NVM is a flash read-only memory (flash ROM).

9. The processing system of claim 1 wherein the NVM control interface comprises:
an NVM address register for specifying addresses of the NVM, wherein an address stored in NVM address register is incremented after a write/read (W/R) operation of the NVM is finished;
an NVM page register for specifying a download capacity of the NVM;
an NVM data register for storing a data byte stored in the address specified by the NVM address register;
a plurality of control bits for setting an operational mode of the NVM; and
a plurality of command registers for specifying commands so as to control operations of the NVM.

10. A method for updating a firmware stored in a non-volatile memory (NVM) of a processing system, the processing system being electrically connected to a computer system and further comprising a NVM control interface having a plurality of registers for updating and accessing data stored in the NVM, the method comprising:
updating a current piece of data stored in the NVM utilizing the NVM control interface; and
during the update of the current piece of data, reading a previous piece of data being stored in the NVM prior to the current piece of data and transmitting the previous piece of data to the computer for comparison with original data that was previously stored in the NVM, if the previous piece of data and the original data are identical, then updating the current piece of data utilizing the NVM control interface.

11. The method of claim 10 wherein the processing system further comprises a processor for controlling operations of the processing system and a bus controller electrically connected to the processor, the NVM, and the NVM control interface for controlling data transmission between the processor, the NVM, and the NVM control interface.

12. The method of claim 11 wherein the processor is for loading the firmware stored in the NVM via the bus controller.

13. The method of claim 11 further comprising:
preventing any data access between the processor and the NVM during the update of the firmware stored in the NVM by utilizing the bus controller.

14. The method of claim 10 wherein the processing system further comprises a serial port interface electrically connected between the computer system and the NVM control interface for converting serial data bits received from the computer into data bytes and for converting data bytes received from the NVM control interface into serial data bits.

15. The method of claim 14 wherein a serial port of the serial port interface is a RS-232 (Recommended Standard-232) port.

16. The method of claim 10 further comprising:
verifying whether or not the previous piece of data has been written into the NVM before the NVM control interface reads the previous piece of data.

17. The method of claim 10 wherein the NVM is a flash read-only memory (flash ROM).

18. The method of claim 10 wherein the NVM control interface comprises:
an NVM address register for specifying addresses of the NVM, wherein an address stored in NVM address register is incremented after a write/read (W/R) operation of the NVM is finished;
an NVM page register for specifying a download capacity of the NVM;
an NVM data register for storing a data byte stored in the address specified by the NVM address register;
a plurality of control bits for specifying an operation mode of the NVM; and
a plurality of command registers for specifying commands so as to control operations of the NVM.

* * * * *